United States Patent
Levkus

(10) Patent No.: US 9,132,544 B2
(45) Date of Patent: Sep. 15, 2015

(54) HANDHELD COLLECTION APPARATUS

(71) Applicant: Florence Levkus, Oakmont, PA (US)

(72) Inventor: Florence Levkus, Oakmont, PA (US)

(*) Notice: Subject to any disclaimer, the term of this patent is extended or adjusted under 35 U.S.C. 154(b) by 0 days.

(21) Appl. No.: 14/278,245

(22) Filed: May 15, 2014

(65) Prior Publication Data

US 2014/0339839 A1  Nov. 20, 2014

Related U.S. Application Data

(60) Provisional application No. 61/824,462, filed on May 17, 2013.

(51) Int. Cl.
  *B25J 15/04* (2006.01)
  *B25J 1/04* (2006.01)
  *E01H 1/12* (2006.01)

(52) U.S. Cl.
  CPC ............... *B25J 1/04* (2013.01); *E01H 1/1206* (2013.01); *E01H 2001/1293* (2013.01)

(58) Field of Classification Search
  USPC .................. 294/1.3–1.5, 209, 211; D30/162; 15/108.8, 257.1, 257.6; 119/161
  See application file for complete search history.

(56) References Cited

U.S. PATENT DOCUMENTS

| | | | |
|---|---|---|---|
| 4,003,595 A | | 1/1977 | Fano et al. |
| D253,915 S | * | 1/1980 | Hennessy et al. ............ D30/162 |
| 4,225,174 A | * | 9/1980 | Hennessy et al. .............. 294/1.4 |
| D281,108 S | * | 10/1985 | Wilson ......................... D30/162 |
| 4,647,094 A | * | 3/1987 | Bergkvist et al. ................. 294/3 |
| 4,854,626 A | * | 8/1989 | Duke ............................. 294/104 |
| 5,380,054 A | * | 1/1995 | Galvis ............................ 294/1.4 |
| D369,444 S | * | 4/1996 | Ubdegrove et al. .......... D30/162 |
| 5,634,678 A | | 6/1997 | Bailey |
| 6,874,833 B2 | * | 4/2005 | Keith et al. .................... 294/209 |
| 7,448,659 B1 | | 11/2008 | Auseklis |
| D623,492 S | * | 9/2010 | James ........................... D30/162 |
| 8,292,339 B1 | | 10/2012 | Auseklis |
| 2008/0030033 A1 | * | 2/2008 | Taylor ............................ 294/1.4 |
| 2008/0042456 A1 | * | 2/2008 | Patel .............................. 294/1.3 |
| 2008/0303295 A1 | * | 12/2008 | Moreno Fernandez De Betono ........................... 294/1.3 |
| 2012/0235431 A1 | | 9/2012 | Beaton |
| 2012/0292933 A1 | | 11/2012 | Krupp |

* cited by examiner

*Primary Examiner* — Paul T Chin
(74) *Attorney, Agent, or Firm* — Daniel Boudwin; Global Intellectual Property Agency LLC

(57) ABSTRACT

A handheld grasper is provided that is adapted for collecting items from the ground. The grasper comprises an elongate member having a handled end and a working end. The grasper further has a pivoting arm having a proximal and distal end. A distal end of the pivot arm is pivotally connected to the elongate member. The handle further comprise a trigger and a tension cable. A distal end of the tension cable is operably connected to the trigger, whereas the proximal end is located within the elongate member and thereafter is connected to the pivot arm. Actuation of the trigger pulls on the tension cable, thereby bringing the working end and distal pivot arm ends together. The distal pivot arm and distal working ends comprise box half receiving members that support removable, interlocking box halves that lock together when mated by the actuation of the trigger.

6 Claims, 3 Drawing Sheets

Figure 3:
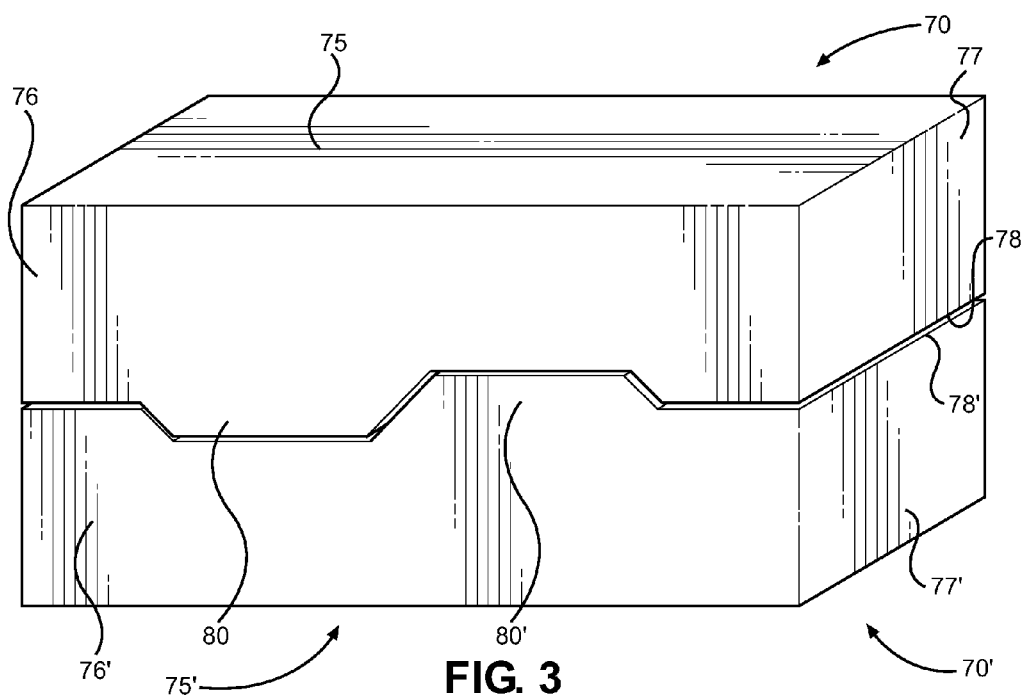

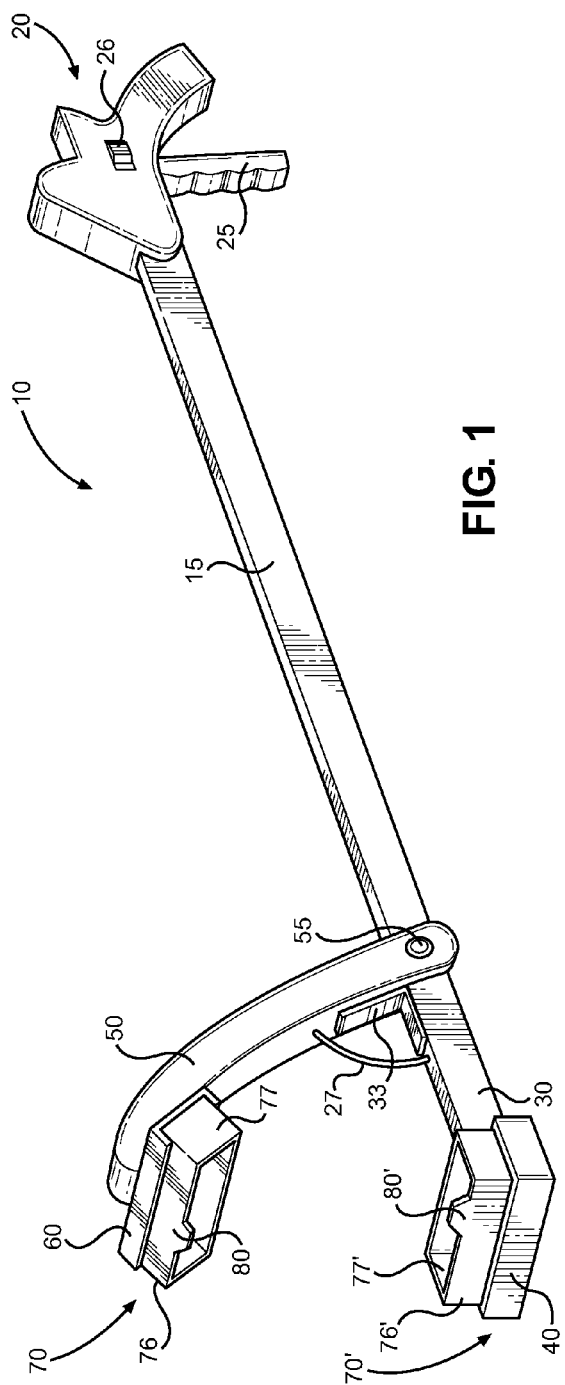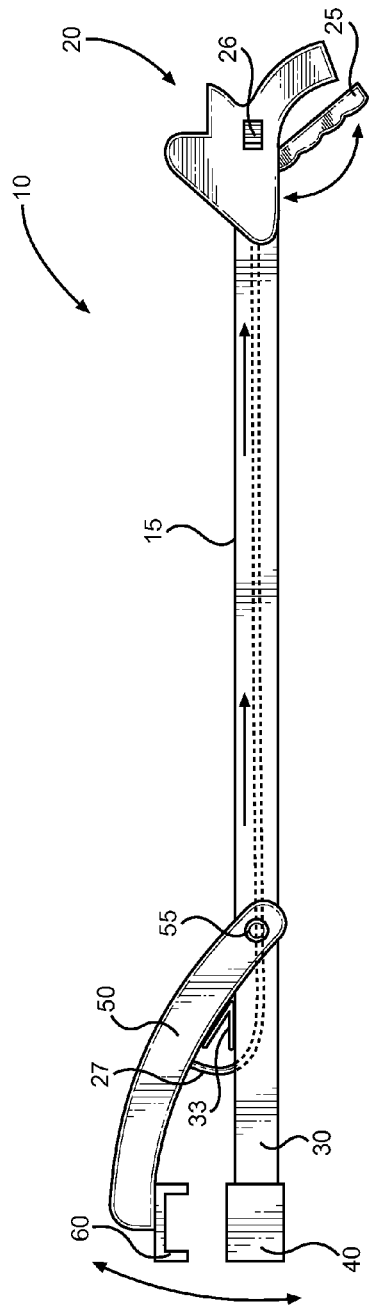
FIG. 1
FIG. 2

HANDHELD COLLECTION APPARATUS

CROSS REFERENCE TO RELATED APPLICATION

This application claims the benefit of U.S. Provisional Application No. 61/824,462 filed on May 17, 2013. The above identified patent application is herein incorporated by reference in its entirety to provide continuity of disclosure.

BACKGROUND OF THE INVENTION

1. Field of the Invention

The present invention relates to a handheld article collection device and pet feces collector. More specifically the invention relates to handheld graspers adapted to support removable, interlocking box halves configured for holding collected items from the ground, including pet feces.

Many people enjoy having pets. The time spent with them during walks and other activities is very enjoyable, however there may be a few downsides. There are many times when a dog may have to go to the bathroom during a walk. While in the backyard of a home the feces may be disposed of at a later time, however when away from the household this is not often possible.

Feces must be removed from the outdoor area and disposed of soon after the dog goes to the bathroom. Many people find it difficult to remove and cleanup the pet's waste. The act of removing the feces often involves contacting, smelling, or feeling the texture of the waste. Moreover, some users may have difficulty bending over to clean up the pet waste.

What is needed is a device that enables a user to collect pet waste without requiring physical contact with the waste, thereby enabling a user to avoid having to feel the texture or smell the pet waste. Most people tend to bring shovels and plastic bags along with them while walking a dog. A user scoops up the dog feces and inserts the waste into the plastic bag. The drawback of this method is that although the user does not directly contact the feces, a user must still come into close proximity with the feces when scooping into a shovel and during insertion into a bag. There is also the possibility that the feces may contact the outside of the bag, thereby contaminating the hands or body of the user.

There are several prior art devices that are designed to prevent these issues from happening. These devices often comprise elongated handles with a clamp or shovel at a distal portion of the handle. These devices enable a user to remove pet feces from an outdoor area without requiring a user to have much contact with the waste. These devices, however, fail to provide efficient disposal means for the collected pet feces.

The present invention differs from the prior art in that it provides an efficient, handheld grasper device for the collection and disposal of items, whereby the items are scooped into a removable and disposable enclosable that can be disposed of after a single use and replaced on the grasper. The device includes an elongated member having a handle at one end and a working end. A proximal end of a pivotal arm is connected to the working end. A user may actuate a trigger to move the distal end of the pivotal arm into contact with the distal end of the working end. A pair of removable and replaceable box halves is secured onto the ends of the device, wherein specifically configured box receiving members are disposed to support the two opposing box halves. The boxes close around articles being picked up, including pet feces, upon actuation of the trigger, thereby retaining the collected items therein. The box halves include locking tabs that maintain the boxes in a closed position once mated, whereby the now-closed box and collected items can be removed from the grasper device and disposed of. Thereafter, replacement box halves are deployed on the ends of the device.

The present invention is primarily adapted for picking up pet feces, but is equally well adapted at picking up garbage or other items on the ground that may need to be collected and disposed of. The present invention allows a user to collect an item using a collection box that surrounds the item and locks the item therein until the box is removed from the grasper and disposed of. The box is biodegradable structure and is a more environmentally friendly than plastic trash bags or plastic pet feces bags. The use of a removable box structure also allows the grasper of the present invention to collects items without the collected items contacting the grasper itself, thereby reducing incidences of contamination and cleaning requirements. Overall, the present invention is well suited for picking up items and allow efficient and environmentally-friendly disposal thereof.

2. Description of the Prior Art

Devices have been disclosed in the prior art that relate to feces collectors. These include devices that have been patented and published in patent application publications. These devices generally relate to elongated scooper systems that are adapted for collecting pet waste. The following is a list of devices deemed most relevant to the present disclosure, which are herein described for the purposes of highlighting and differentiating the unique aspects of the present invention, and further highlighting the drawbacks existing in the prior art.

One such prior art device that fails to anticipate the present invention is U.S. Pat. No. 5,634,678 to Bailey. The device of Bailey provides a portable dog waste receiver. The receiver includes a telescopic handle with a disposable collection bag that is supported on the handle by an annular ring. After use a spring loaded head discharges the bag from the handle, thereby enabling the disposal of the bag. The prior art device, however, differs from the present invention in that it is configured to be held beneath the pet while the pet is attempting to go to the bathroom, whereas the present invention is configured to collect feces after the pet has gone to the bathroom.

Another prior art device, U.S. Pat. No. 8,292,339 to Auseklis, provides a waste collection system that is configured to collect pet feces or other similar sized objects. The device includes a hand-held scooper with a liner. Once within the scooper, a pivot arm within the scooper pushes the waist into the liner. The waste and the liner may then be disposed of at a later time. The prior art, however, fails to provide a pair of box halves that interlock around the pet feces.

Another prior art device by Auseklis, U.S. Pat. No. 7,448,659, provides a pet debris scooper system that is configured for picking up solid objects, such as pet waste. The device is placed over pet waste and a pair of shovel halves are actuated to close around waste matter. Although similar in nature and relevant to the present invention, the prior art of Auseklis fails to provide a pair of detachable boxes that are configured for collecting pet waste.

Yet another prior art device, U.S. Pat. No. 4,003,595 to Fano provides a sanitary waste receiver that is configured for receiving a pet's waste products. The receiver includes a disposable container that is positioned on the distal end of an elongated handle. While the device is useful for its own purposes, it fails to anticipate the prior art by requiring a user to position the device beneath a dog whereas the present invention is configured for collecting feces after an animal has gone to the bathroom.

Another prior art device, U.S. Patent Publication No. 2012/0292933 to Krupp provides a feces scooper with an illuminating means. The device comprises an elongated frame member and a receptacle mounted on the lower end of the frame. The receptacle is operable between an open and closed position by actuation of a handle during collection of pet waste matter. The device also includes a light that is mounted on the elongated frame member, thereby providing visibility on the feces when used in dark environments. Although the prior art device is similar in nature and relevant to the present invention, it differs in that it fails to provide a pair of disposable box halves that are configured to lock together around dog feces, thereby enabling containment and disposal of the feces.

Finally, U.S. Patent Publication No. 2012/0235431 to Beaton provides a waste collection device for catching and collecting animal droppings. The device may be positioned underneath a pet to catch droppings, or may be utilized to collect droppings from the ground with a blade arm that enables scooping waste droppings from a flat surface into the bag. While useful for its own purposes, the prior art device of Beaton fails to provide a pair of interlocking boxes positioned on the end of a handheld grasping device, thereby enabling easy collection and disposal of pet waste.

The present invention, however, provides a collection device comprising a handheld grasper that is configured for collecting items using removable and replaceable box halves and a device configured to support the same. The grasper of the present invention includes an elongated member with a handle, a working end, and a pivoting arm that is connected to the elongated member. The handle includes a trigger and tension cable, whereby actuation of the trigger tensions the tension cable and draws the pivoting arm towards the working end of the grasper. The assembly supports a pair of box halves such that when the trigger is pulled the box halves mate with one another around an object to be collected. Closure of the pivotal arm onto the working end brings the two box halves together. The user may then remove and dispose of the box or lock the working end and pivotal arm together to hold the box therein until a proper trash receptacle is found.

It is submitted that the present invention is substantially divergent in design elements from the prior art and consequently it is clear that there is a need in the art for an improvement to pet feces collection devices. In this regard the instant invention substantially fulfills these needs.

SUMMARY OF THE INVENTION

In view of the foregoing disadvantages inherent in the known types of collection and grasper devices now present in the prior art, the present invention provides a new collection and disposal device wherein the same can be utilized for providing convenience for the user when an efficient collection and disposal device is desired.

It is therefore an object of the present invention to provide a new and improved handheld collection device that has all of the advantages of the prior art and none of the disadvantages.

It is another object of the present invention to provide a collection device that comprises a handheld grasper that is configured to support removable collection boxes at the working end thereof, whereby the two halves of the collection box is supported in an open position prior to being drawn together around an item to be collected, whereafter the closed box is discarded and replaced on the grasper device.

Another object of the present invention is to provide removable collection boxes from the grasper device such that cleaning of the grasper after use is not required.

Yet another object of the present invention is to provide a collection device that comprises a closable and lockable grasper assembly, whereby the device closes two box halves around an item and can be locked into position thereafter.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 displays a perspective view of the present invention, whereby the device comprises an open configuration.

FIG. 2 displays a view of the handheld grasper, whereby the trigger is actuated.

FIG. 3 displays a view of the mated boxes.

Figure 4:
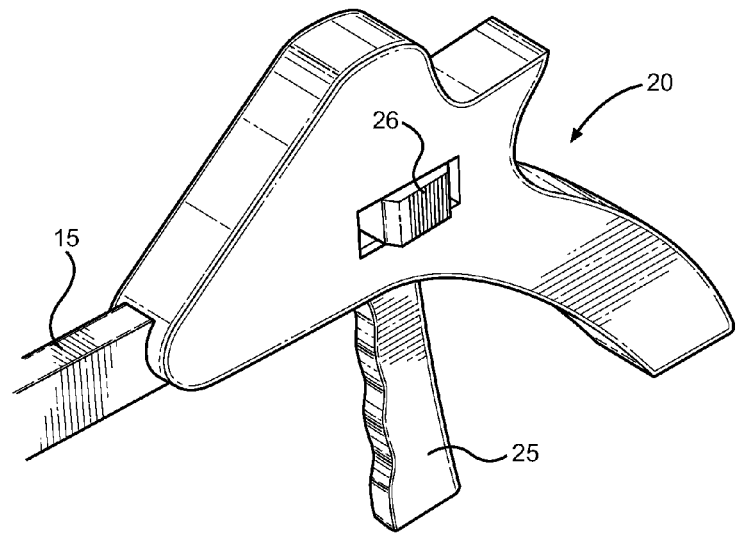

FIG. 4 displays a view of the handle of the handheld grasper.

Figure 5:
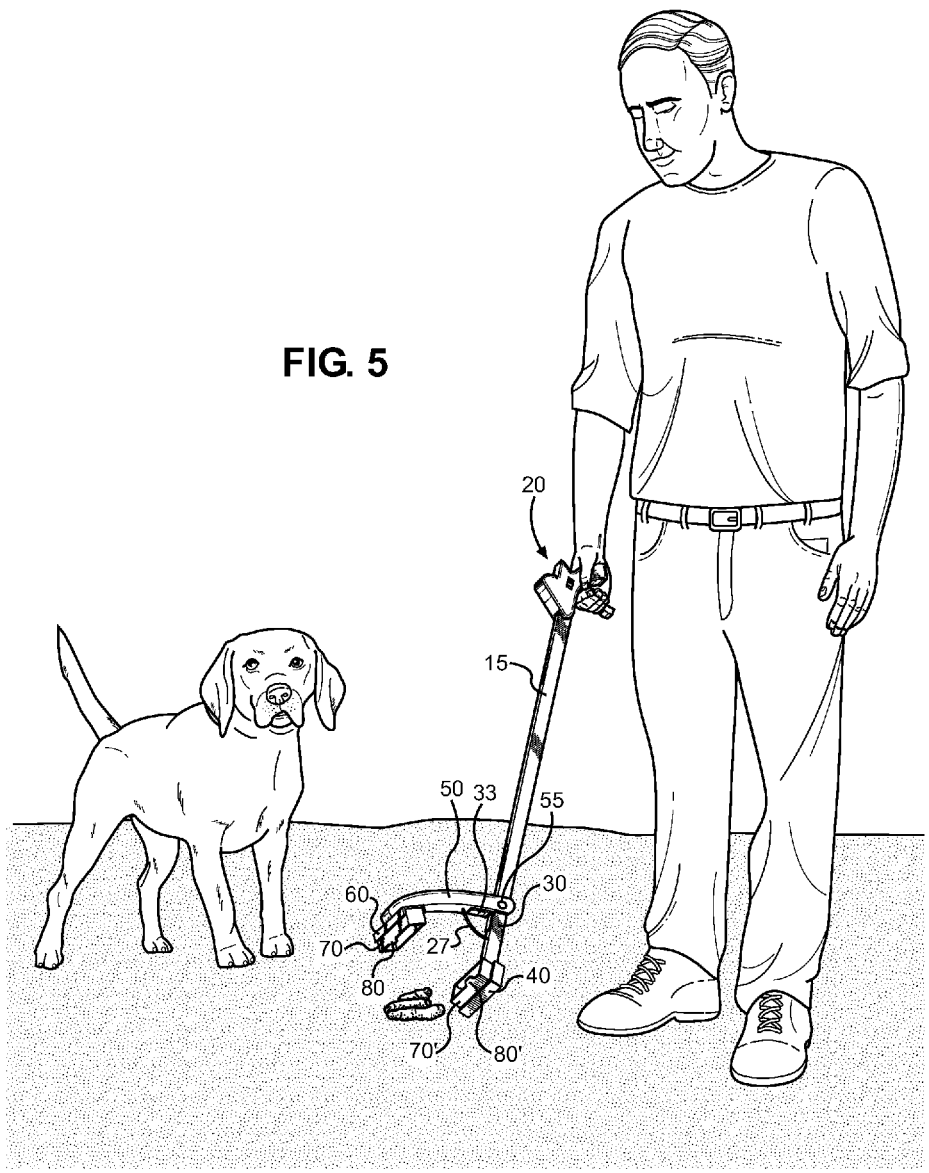

FIG. 5 displays a view of the handheld grasper in use.

DETAILED DESCRIPTION OF THE INVENTION

Reference is made herein to the attached drawings. Like reference numerals are used throughout the drawings to depict like or similar elements of the handheld grasper. For the purposes of presenting a brief and clear description of the present invention, the preferred embodiment will be discussed as used for the containment of dog feces. The figures are intended for representative purposes only and should not be considered to be limiting in any respect.

Referring now to FIG. 1, there is shown a perspective view of the handheld grasper 10 that is configured for collecting and disposing of pet feces. The grasper comprises an elongated member 15 having a handle end 20 at one end and a distal working end 30 opposite the handle 20. A proximal end of a pivot arm 50 is pivotally connected to a proximal end of the working end 30 portion of the elongated arm 15 by a fastener 55 that functions as the proximal end of the working end 30 and the pivotal arm 50. The handle end 20 comprises a trigger 25 connected to a proximal end of a tension cable 27. The distal end of the tension cable 27 is operatively connected to the pivotal arm 50. Actuation of the trigger 25 applies a pulling force on the tension cable 27, thereby facilitating a downward movement of the pivot arm 50 towards the working end 30.

The distal end of the working end 30 and the distal end pivotal arm 50 each comprise square shaped box receiving member 40, 60. The receiving members comprise a first box receiving member 40 and a second box receiving member 60 that are each configured to receive an open box half 70, 70'. The box halves 70, 70' may comprise a base, four upstanding side walls, and an open interior. The base of the boxes may be sized for placement onto a box receiving area. The base may be securable onto the receiving members by a light adhesive or similar type of fastener. Placement within the receiving members maintains the boxes 70, 70' in place until removed by the user. The box halves may further comprise interlocking tabs 80, 80', whereby the tab 80' of the working end 30 is configured for connection with the tab 80 of the box half 70 located on the pivotal arm 50.

In FIG. 2, there is shown a view the actuated trigger 25 of the handheld feces collection grasper 10. The trigger 25 is configured to facilitate user control over the grasping device. A proximal end of a tension cable 27 is operably connected to the trigger 25. The remainder of the cable is threaded through an internal channel within the elongated member 15. A distal end of the cable 27 exits the working end 30 of the elongated member 15 and is secured onto the pivotal arm 50.

Actuation of the tension cable 27 facilitates a movement of the pivotal arm 50 towards the working end 30. An L-shaped return spring 33 is located at the connecting angle of the working end 30 and the pivotal arm 50. The return spring 33 applies a resistive force against the closure of the working end 30 and pivotal arm 50 after each actuation of the trigger 50. Thereafter, the return spring 33 pushes against the pivotal arm 50 to return the arm to its uppermost position, thus enabling successive uses of the handheld feces collection grasper 10.

FIG. 3 illustrates the mated box halves of feces collection device 10. The upper box half 70 is configured for insertion and securement in the receiving member of the pivotal arm (50, See FIG. 1), and the lower box half 70' is configured for reception in the receiving member of the working end (40, See FIG. 1). The box halves 70, 70' each comprise a flat rectangular base 75, 75', four upstanding side walls that are connected to the base, and an open interior formed by the adjacent connection of the upstanding side walls. The upstanding side walls are comprised of two pairs of opposing wall members, whereby two of the members are of a greater length 76, 76' along the base 75, 75' and two are of a lesser length 77, 77', thereby matching the lengthwise and widthwise perimeter of the rectangular receiving members. A securing member is located on the upper surface 78, 78' of one of the two longer upstanding side walls 76, 76'. In a preferred embodiment, the securing members may be in the form of interlocking tabs 80, 80' that fasten the box into a single unit when mated. Alternatively, the securing member may comprise other suitable securing members, such as fasteners and adhesives.

The box halves 70, 70' may be comprised of a biodegradable material that is capable of containing solids and liquids therein, for example, pet feces. The halves 70, 70' may be made of a paperboard or plastic material. The boxes 70, 70' of the working end 70' and the pivotal arm 70 comprise upstanding side walls 76, 76' that have mating tabs 80, 80'. During closure, the mated box is retaining in either the pivotal arm receiving member (60, See FIG. 1) or the receiving member of the working end (40, See FIG. 1). A user may then dispose of the biodegradable box by either manually removing the mated box from the receiver, or by shaking the box free of the receiver over a waste disposal basket.

FIG. 4 displays a view of the handled end of the handheld feces collection device. The handle 20 comprises a trigger 25 that is operably connected to a locking mechanism 26 and a tension cable 27. Actuation of the trigger pulls 25 on the tension cable 27. The tension cable 27 then pulls on the pivotal arm (50, See FIG. 2), thus bringing the pivotal arm in proximity to the working end of the elongated member 15. The locking member 26 is configured to maintain the tension cable 27 at a fixed position, thereby holding the pivotal arm (50) in a fixed position in relation to the working end (30, See FIG. 2). The locking member 26 may contact the tension cable 27 and prevent the cable from moving in a direction that would separate the pivotal end from the working end. The locking of the pivotal arm (50, See FIG. 2) enables a user to retain the box within the receiving members (40, 60, See FIG. 2) until the user reaches a suitable location for disposing of the mated box.

FIG. 5 a view of the feces collection device in use. A user may place the bases (75, 75', See FIG. 4) of the box halves 70, 70' on top of the box receiving members of the working end 30 and the pivotal arm 50. An optional adhesive along the surface of the box bases 75, 75' provides a temporary fastener between the receiving member 40, 60 and the base of the box halves. The user may then position the working 40 and pivotal ends 60 receiving members of the handheld grasper over the pet feces or other object desired for containment. Actuation of the trigger 25 facilitates the closure of the second box receiving member 60 of the pivotal arm 50 over the first box receiving member 40 of the working end 30. The closure of the ends of the handheld grasper bring the box halves into proximity of each other.

The upper surfaces 78, 78' of the opposing lengthwise upstanding side walls 76, 76' each comprise locking tabs (80, 80', See FIG. 3). The tabs interlock and fasten to one another when the box halves 70, 70' are mated, thereby securing the received items therebetween. The mated box is then secured together and positioned within the receiving member of the working end 40 or the pivotal arm 60. A user may then manually remove the mated box or separate the mated box from the receiving members by contact with a trash receptacle. The device provides an effective means for disposing of pet feces without requiring a user to come into close proximity with the feces, and further provides a biodegradable container that contains liquids, solids, and odors more efficiently than traditional means. The box is removable and replaceable with a substitute, replacement box for subsequent material pickups. In this way the box is a separate structure that can be provided in bulk to the user, whereby the box is a replaceable structure deployed on the grasper assembly.

It is alternatively presented that the receiving members of the pivotal arm 50 and working end 30 may comprises a variety of sizes, including that of small, medium, and larger dimensions. Likewise, the associated boxes 80, 80' may be sized to fit within the receiving members. Additionally, the receiving members and boxes may comprise different shapes, such as squared.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A handheld collection device, comprising;
   an elongated member having a handle end and an opposing working end;
   a pivot arm having a proximal end and a distal end, said proximal end being pivotably connected to said elongated member;

said handle end further comprising a trigger, said trigger is operably connected to a tension cable having a proximal end and a distal end;

wherein said proximal end of said tension cable is connected to said trigger, and said distal end of said tension cable is connected to said pivot arm;

said distal end of said pivotal arm further comprising a first box receiving member;

said working end of said elongated member further comprising a second box receiving member;

whereby actuation of said trigger tensions said tension cable, thereby facilitating a rotation of said pivot arm towards said elongated member working end to align said first box receiving member and said second box receiving member;

said first box receiving member and said second box receiving member each being configured to removably support open halves of a box.

2. The collection device of claim 1, further comprising:

a first open box half disposed within said first box receiving member;

a second open box half disposed within said second box receiving member;

said first open box half and said second open box half comprising interlocking tabs adapted to join said first open box half to said second open box half when aligned.

3. The collection device of claim 1, wherein said pivot arm and working end are biased away from each other.

4. The collection device of claim 1, wherein said handle end further comprises a locking mechanism configured for retaining said tension cable in a fixed state.

5. The collection device of claim 1, wherein a return spring is positioned to apply a resistive force against closure of said pivotal arm onto said working end.

6. The collection device of claim 5, wherein said return spring further comprises an L-shaped member positioned at the apex of connecting angle between said pivot arm and said elongated member.

* * * * *